(12) United States Patent
Onozuka et al.

(10) Patent No.: US 7,810,417 B2
(45) Date of Patent: Oct. 12, 2010

(54) METHOD FOR ESTIMATING SELF-VIBRATION OF MILLING TOOL IN THE OPERATING PROCESS

(75) Inventors: Hideaki Onozuka, Sagamihara (JP); Masayuki Kyoi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 868 days.

(21) Appl. No.: 11/640,870

(22) Filed: Dec. 19, 2006

(65) Prior Publication Data
US 2007/0201956 A1 Aug. 30, 2007

(30) Foreign Application Priority Data
Dec. 20, 2005 (JP) .............................. 2005-365694

(51) Int. Cl.
*B23B 3/00* (2006.01)
(52) U.S. Cl. .......................... 82/1.11; 407/193; 700/52; 700/173
(58) Field of Classification Search ................. 82/1.11; 409/80, 186, 193; 700/173, 52
See application file for complete search history.

(56) References Cited

U.S. PATENT DOCUMENTS

| | | | | |
|---|---|---|---|---|
| 4,047,469 A | * | 9/1977 | Sakata | 409/132 |
| 4,640,156 A | * | 2/1987 | Nakagawa et al. | 82/1.11 |
| 4,759,243 A | * | 7/1988 | Thompson | 82/1.11 |
| 6,772,039 B2 | * | 8/2004 | Kakino et al. | 700/160 |
| 6,956,794 B2 | * | 10/2005 | Nakamura et al. | 368/203 |
| 7,500,812 B2 | * | 3/2009 | Onozuka et al. | 409/132 |
| 2002/0146296 A1 | * | 10/2002 | Schmitz et al. | 409/131 |
| 2003/0128631 A1 | * | 7/2003 | Nakamura et al. | 368/204 |

OTHER PUBLICATIONS

Altintas, "Anaylityical Prediction of Stability Lobes in Milling." CIRP-Manufacturing Technology vol. 44 (1995); 357-362.*
Y. Altintas, et al. "Analytical Prediction of Stability Lobes in Milling", Annals of the CIRP vol. 44/1/1995: pp. 357-362.

* cited by examiner

*Primary Examiner*—Jason Daniel Prone
*Assistant Examiner*—Jennifer Swinney
(74) *Attorney, Agent, or Firm*—Antonelli, Terry, Stout & Kraus, LLP.

(57) ABSTRACT

In a cutting method of an oblique surface by a rotary tool, for analyzing in advance a stability limit depth of cut with respect to a self-excited cutting vibration in consideration of a pick feed amount and a work oblique angle and reducing the number of steps necessary for preparation and correction of NC data, a tool diameter, the number of cutting teeth and dynamic stiffness of the rotary tool, a cutting force coefficient determined by a combination of the tool and work materials, dynamic stiffness of the work, the pick feed amount, oblique angles between the tool and the work and the like are used as input values, an initial value of the stability limit depth of cut is determined based on the input values, and calculation is performed based on the initial value. In this case, the initial value is compared with the calculated value, the initial value is corrected by a certain rule, and the calculation is repeated until both the initial value and the calculated value fall in a constant error range to thereby calculate the stability limit depth of cut during the oblique cutting.

6 Claims, 6 Drawing Sheets

METHOD FOR ESTIMATING SELF-VIBRATION OF MILLING TOOL IN THE OPERATING PROCESS

INCORPORATION BY REFERENCE

The present application claims priority from Japanese application JP 2005-365694 filed on Dec. 20, 2005, the content of which is hereby incorporated by reference into this application.

BACKGROUND OF THE INVENTION

The present invention relates to a method for estimating stable processing conditions in advance in order to prevent a self-excited cutting vibration which causes deterioration of a processing precision and breakage of a cutting tool in a case of processing a three-dimensional shape by a machine tool in which the cutting tool is moved while rotating the cutting tool.

In a cutting step by a rotary tool, relative vibrations of the tool and a work are sometimes generated due to low stiffness on a tool side or a work side or the like. The relative vibrations of the tool and the work are generated by a forced vibration or a self-excited vibration.

In the relative vibrations due to the former forced vibration, when a cutting edge of the rotary tool cuts through the work, a cutting force acts between the tool and the work, and a relative displacement is caused by this cutting force. In this case, the tool or the work vibrates at a cutting frequency determined by a product of the number of revolutions and the number of the cutting teeth of the tool. When the vibration (an amplitude) is large, a noise or a vibration of a processing machine is generated.

On the other hand, in the relative vibration due to the latter self-excited vibration, the vibration is generated in the vicinity of a natural frequency of a mechanical system such as the cutting tool, the machine tool or the work. The vibration has a characteristic that it does not start immediately after start of the cutting, but gradually increases as the cutting proceeds. In this case, the natural frequency of the mechanical system is generally several hundreds of hertz to several kilohertz in many cases. The noise due to the vibration has a comparatively high tone.

This self-excited vibration is modeled by a regenerative vibration theory proposed by Tlusty et al., and a technique to estimate the vibration in a numerical analysis manner is established. In this theory, an increase of the vibration of the tool during the cutting is referred to as a regeneration effect. Specifically, as shown in FIG. 2, this is a phenomenon in which the vibration of the tool is generated by a fluctuation of a chip thickness in a case where a wave surface formed by cutting the work with a cutting edge while vibrating in a previous period is cut by the next passing cutting edge, and the vibration increases as the cutting proceeds.

Figure 2:
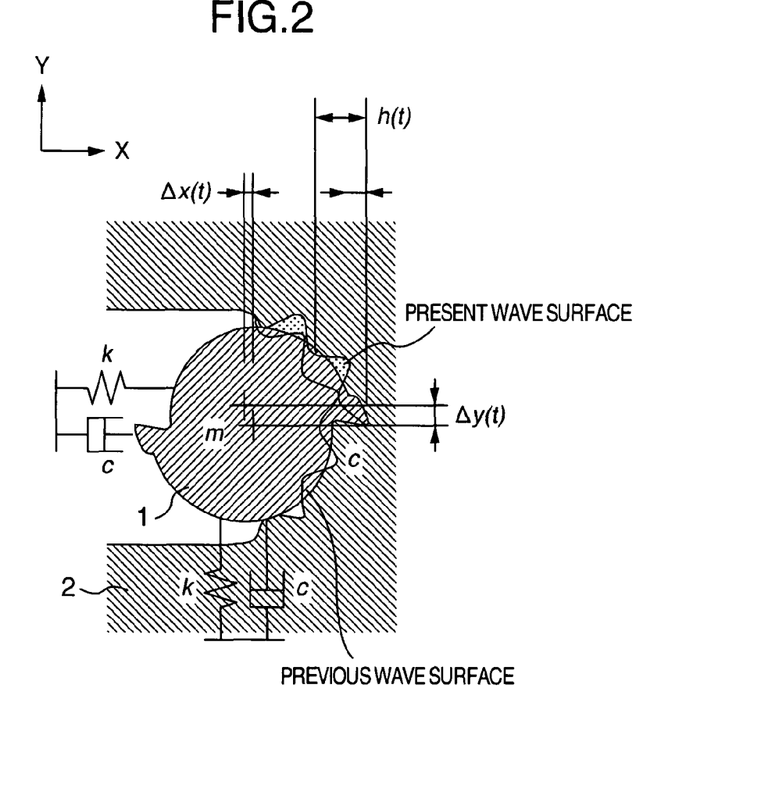
FIG. 2 is an explanatory view of a self-excited cutting vibration of a rotary tool.

In FIG. 2, a chip thickness h(t) at a time t is represented by Equation (1):

$$h(t)=h_0-x(t-\Delta t)+x(t) \quad (1)$$

in which $\Delta t$ is a cutting period, x(t) is a displacement of the tool, and $h_0$ is an initial chip thickness on processing conditions, that is, a tool feed amount per cutting tooth.

On the other hand, in a case where a motion of the tool is set to one degree of freedom as shown in FIG. 2, the motion of the tool is represented by the following equation:

$$F=m\ddot{x}+c\dot{x}+kx \quad (2)$$

in which m is a mode mass, k is a spring constant, c is a decay constant, and F is an external force.

Moreover, the external force F of the above equation is a cutting force which acts between the tool and the work, and is represented by Equation (3):

$$F=aKh(t) \quad (3)$$

in which h(t) is the chip thickness, a is an axial depth of a cut (indicating an amount of the cut formed by the tool in a direction vertical to a drawing sheet surface in FIG. 2), and K is a proportionality factor determined by a combination of a tool geometry of the tool and a material to be cut.

Therefore, Equation (4) is derived using Equations (2) and (3).

$$m\ddot{x}+c\dot{x}+kx=aKh(t) \quad (4)$$

Figure 3:
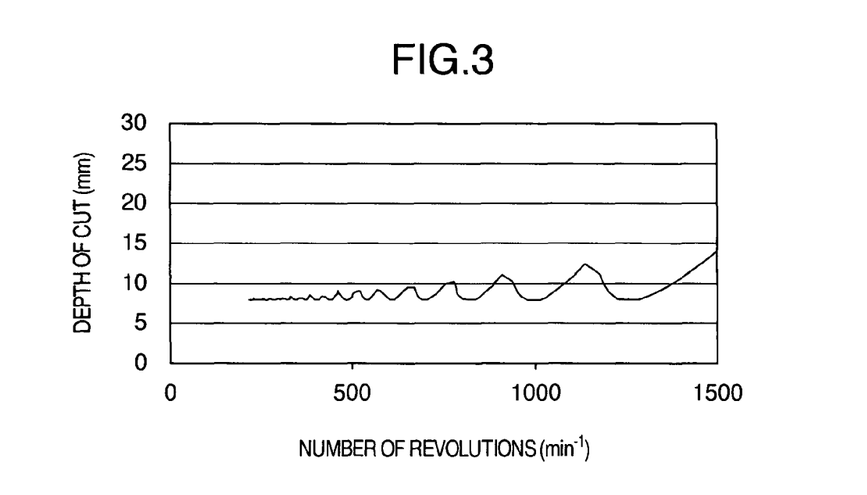
FIG. 3 is an explanatory view of stability of the self-excited cutting vibration of the rotary tool.

When a transfer function of a system represented by Equations (1) and (4) described above is evaluated and the stable axial depth a of the cut is mapped with respect to various cutting periods $\Delta t$, a curve is obtained as shown in FIG. 3. The cutting period can be converted into the number of the revolutions, if the number of the cutting teeth of the tool is known.

FIG. 3 shows a curve referred to as a stability limit curve. It is indicated that the depth of the cut larger than the depth shown by the curve is unstable, that is, the self-excited vibration is generated. In a case where this stability limit depth of the cut is estimated in advance to prepare an NC code, the NC code does not have to be adjusted afterwards due to the vibration generation, and the number of steps can largely be reduced.

In a document of Y. Altintas and E. Budak, 1995 Analytical Prediction of Stability Lobes in Milling Annals of the CIRP Vol. 44/1/1995: 357 to 362, a technique is developed in which a self-excited cutting vibration is regarded as a linear system to obtain the stability limit curve. According to the document, the stability limit curve can be obtained in a short time without repeatedly calculating any acceleration, speed or displacement that acts between the tool and the work corresponding to each of times in a time range.

Figure 4:
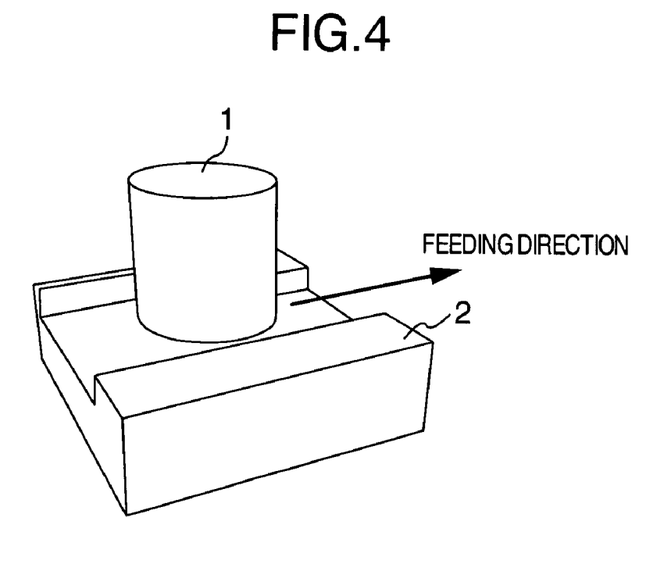
FIG. 4 is an explanatory view of a cutting method as an object in a conventional method.
Figure 6:
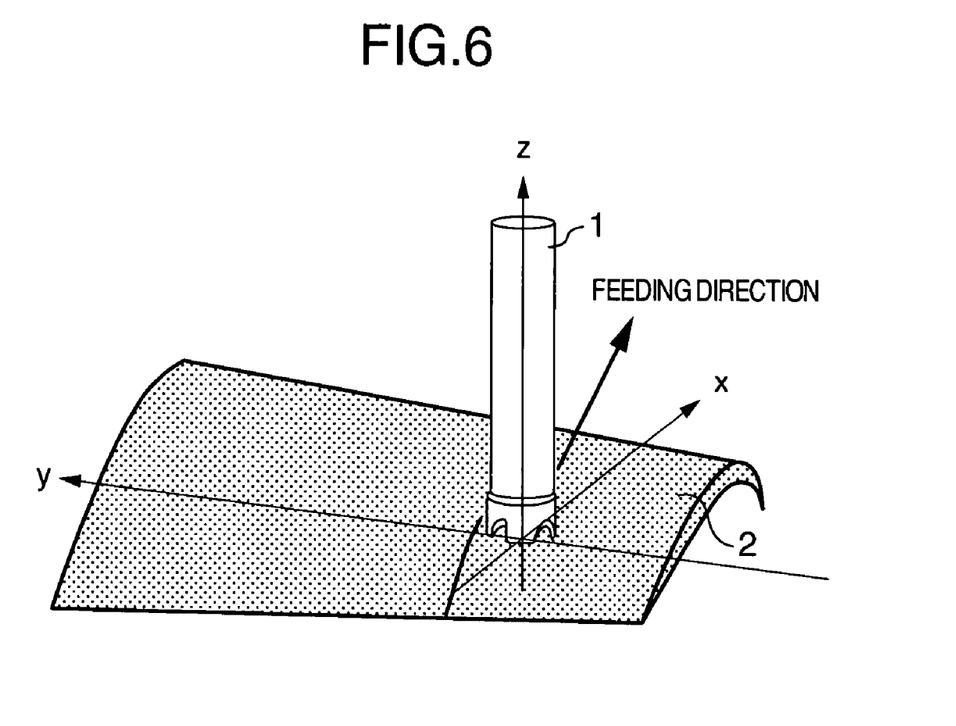
FIG. 6 is an explanatory view showing a case where the rotary tool according to the present invention is moved in a vertical direction to perform the cutting.

However, the conventional self-excited cutting vibration analysis technique can only be applied to a case where a tool feeding direction is located in a plane vertical to a rotary shaft of the tool as in slotting in an XY-plane shown in FIG. 4. That is, the rotary shaft and the feeding direction of the tool, and an oblique angle of a processed surface are not considered. In actual component processing, for example, cutting of an oblique surface such as a wing surface of a fluid component shown in FIG. 6, the feeding direction of the tool may be not located in the plane vertical to the rotary shaft of the tool in some case.

SUMMARY OF THE INVENTION

In the present invention, there is proposed a method for estimating a self-excited cutting vibration in order to cope with the above case.

To solve the above problem, the present invention is characterized in that a tool movement amount in a direction substantially perpendicular to a tool rotation shaft and to a tool feeding direction, that is, a pick feed amount can be used as an input value.

Moreover, the present invention is characterized in that an angle formed by the tool rotation shaft and the tool feeding direction, that is, a work oblique angle during oblique cutting can be used as an input value.

Furthermore, the present invention includes a calculation algorithm to repeat: obtaining a cutting start angle and a cutting end angle based on a presumed value of a stability limit depth of cut to calculate the stability limit depth of cut; and correcting the presumed value, until the presumed value and a calculated value fall in a constant error range.

As described above, when repeating: presuming an appropriate value of the stability limit depth of cut once; obtaining the cutting start angle and the cutting end angle of a rotary tool based on the presumed value to calculate the stability limit depth of cut; and correcting the presumed value until the initially presumed value and a calculated result fall in the constant error range, it is possible to analytically obtain the stability limit depth of cut in the oblique cutting.

As a result, even in a case where the rotation shaft of the tool is not perpendicular to the feeding direction during processing of a wing surface of a fluid machine component or the like, it is possible to set a stable cut which does not generate any self-excited cutting vibration, an NC code can be prepared, and the number of correction steps can be reduced.

These and other features, objects and advantages of the present invention will become more apparent from the following description when taken in conjunction with the accompanying drawings.

BRIEF DESCRIPTION OF THE DRAWINGS

FIGS. 7A and 7B are explanatory views of a cutting tolerance during oblique cutting.

DETAILED DESCRIPTION OF PREFERRED EMBODIMENT

A method for estimating a self-excited cutting vibration during oblique cutting according to the present invention will hereinafter be described with reference to the drawings.

Figure 1:
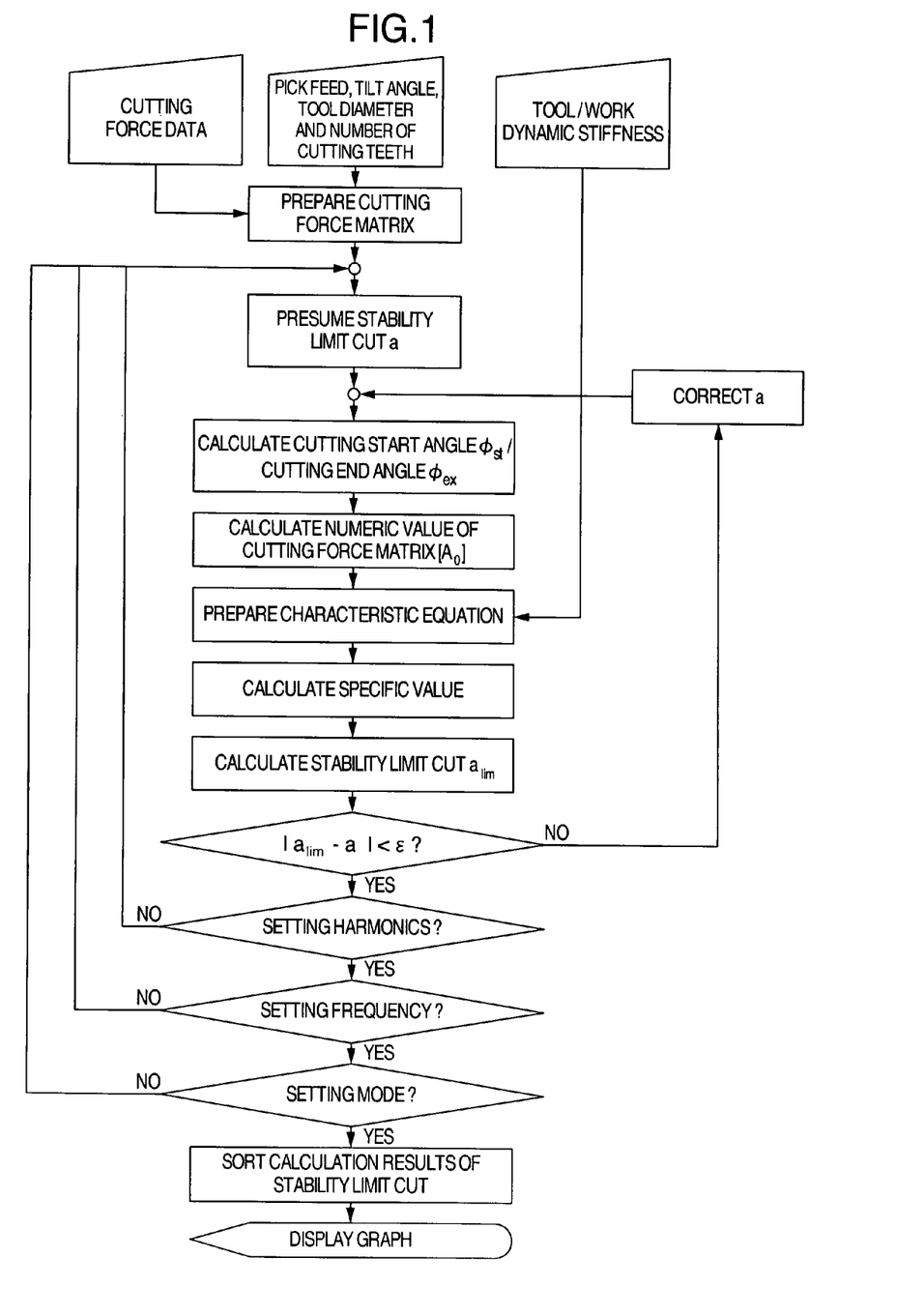
FIG. 1 is a flow chart for estimating a stability limit depth of cut during oblique cutting according to the present invention.

First, in the method according to the present invention, as shown in a flow chart of FIG. 1, the followings are given as input values:

(1) a cutting force coefficient determined by a combination of a tool geometry of a cutting tool and a material of a work;

(2) a pick feed amount Pf, a work oblique angle γ, a tool diameter R and the number N of cutting teeth; and (3) dynamic stiffness of the tool and the work.

As described in the above document, in FIG. 2, a fluctuation amount $h(\phi_j)$ of a chip thickness at a time when a j-th cutting tooth is disposed at an angle $\phi_j$ from a direction (a Y-direction) perpendicular to a feeding direction, that is, an X-direction, is given by Equation (5):

$$h(\phi_j) = (\Delta x \cos \phi_j + \Delta y \sin \phi_j)(\phi_j) \quad (5)$$

in which $\Delta x$, $\Delta y$ are displacement amounts of the center of the tool, and $g(\phi_j)$ is a function represented by Equation (6):

$$g(\phi_j) = 1 \leftarrow \phi_{st} < \phi_j < \phi_{ex}$$

$$g(\phi_j) = 0 \leftarrow \phi_j < \phi_{st} \text{ or } \phi_{ex} < \phi_j \quad (6)$$

in which $\phi_{st}$ is an angle at which the cutting tooth starts the cutting, and $\phi_{ex}$ is an angle at which the cutting tooth ends the cutting.

Figure 7A:
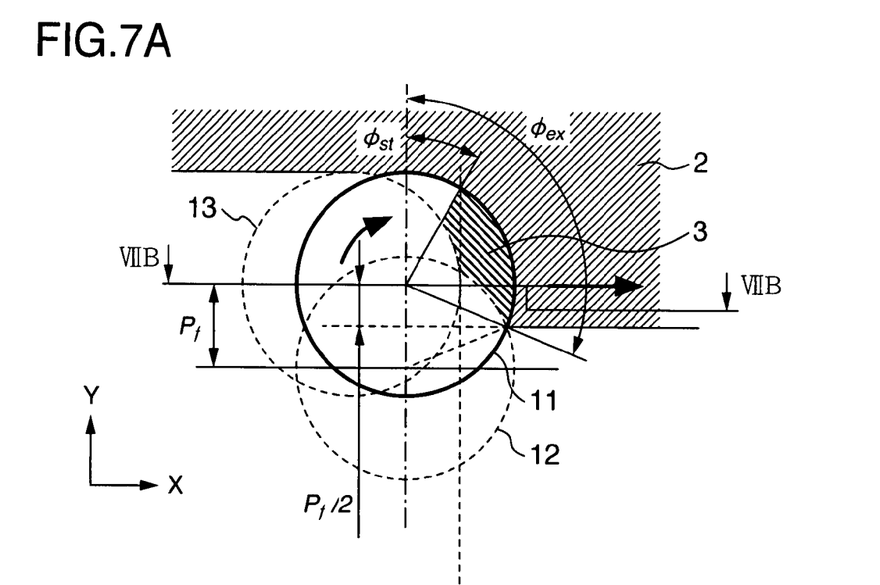
FIG. 7A is a plan view showing the oblique cutting.
Figure 7B:
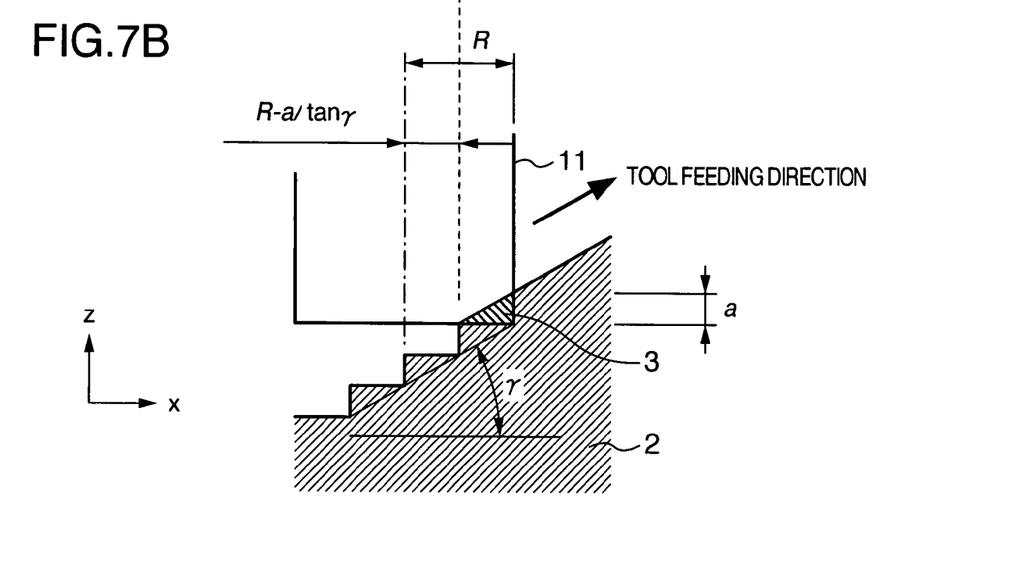
FIG. 7B is a sectional view of a side portion taken along the VIIB-VIIB line of FIG. 7A.

As shown in FIGS. 7A and 7B, during the oblique cutting, when the cutting tooth cuts upwards the surface, the cutting start angle $\phi_{st}$ is not zero. The cutting does not start until rotation proceeds to some extent. Therefore, to calculate the above cutting start angle based on a position of the tool in FIG. 7A, a position where a rotary tool is currently disposed during the oblique cutting is denoted with reference numeral 11, a position where the rotary tool is disposed along a movement path before a pick field is denoted with reference numeral 12, and a position of the rotary tool in a previous period is denoted with reference numeral 13. FIG. 7B is an explanatory view of a cutting state in a sectional direction of FIG. 7A. During the oblique cutting, an axial depth a of cut is a height of a shown triangular region. Therefore, in FIG. 7A, each angle $\phi_{st}$ at which the cutting tooth starts the cutting is geometrically represented by Equation (7).

$$\phi_{st} = \sin^{-1}\left[\frac{R - a/\tan\gamma}{R}\right] \leftarrow a/\tan\gamma < R \quad (7)$$

$$\phi_{st} = 0 \leftarrow a/\tan\gamma \geq R$$

Moreover, the angle $\phi_{ex}$ at which the cutting is ended is given by Equation (8) from FIG. 7A:

$$\phi_{ex} = \pi - \cos^{-1}\frac{Pf}{2R} \quad (8)$$

$$= \cos^{-1}\frac{-Pf}{2R}$$

Figure 9:
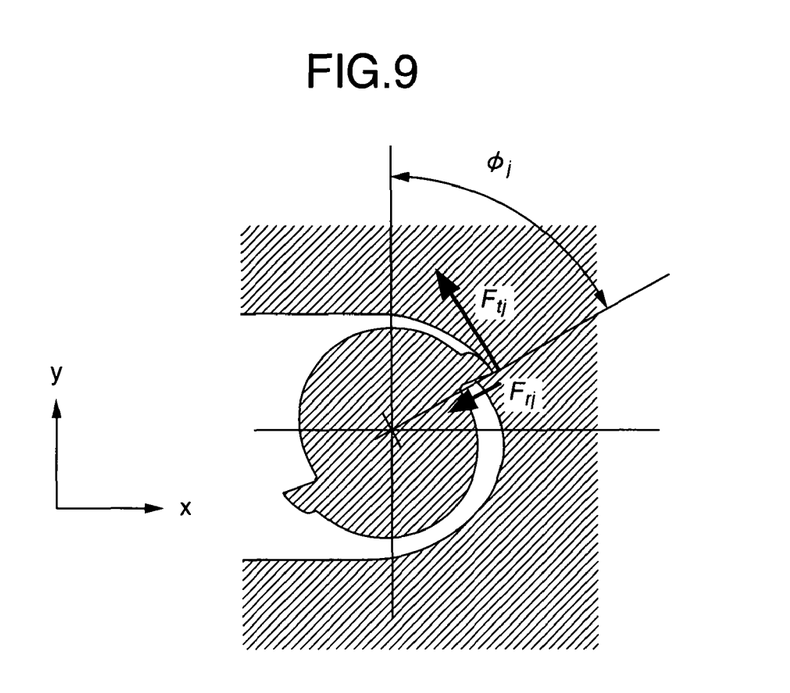
FIG. 9 is a schematic diagram showing cutting forces in a tangent direction and a radial direction which act on a j-th cutting tooth.

Next, cutting forces in a tangent direction and a radial direction which act on the j-th cutting tooth as shown in FIG. 9 are represented by Equation (9), respectively:

$$F_{tj} = K_t \cdot a \cdot h(\phi_j)$$

$$F_{rj} = K_r \cdot F_{tj} \quad (9)$$

in which $F_{tj}$ and $F_{rj}$ are positive values. The directions of the cutting forces received by the cutting tooth are as shown in FIG. 9.

Moreover, $K_t$ and $K_r$ are constants obtained from an experiment, and are values determined by the material of the work and the tool geometry. They are converted in x- and y-directions as follows. Moreover, $F_{xj}$ and $F_{yj}$ are set to be positive values when the forces have a positive direction along an x-axis and a y-axis.

$$F_{xj} = -F_{tj} \cos\phi_j - F_{rj} \sin\phi_j$$

$$F_{yj} = F_{tj}\sin\phi_j - F_{rj}\cos\phi_j \quad (10)$$

Next, assuming that the number of the cutting teeth of the tool is N, forces which act on the whole tool are represented by Equation (11).

$$F_x = \sum_{j=0}^{N-1} F_{xj} \quad (11)$$
$$F_y = \sum_{j=0}^{N-1} F_{yj}$$

When the forces are indicated in a matrix, they are represented by Equation (12).

$$\begin{aligned}
\begin{bmatrix} F_x \\ F_y \end{bmatrix} &= \sum_{j=0}^{N-1} \begin{bmatrix} F_{xj} \\ F_{yj} \end{bmatrix} \\
&= \sum_{j=0}^{N-1} \begin{bmatrix} -\cos\phi_j & -\sin\phi_j \\ -\sin\phi_j & -\cos\phi_j \end{bmatrix} \begin{bmatrix} F_{tj} \\ F_{rj} \end{bmatrix} \\
&= \sum_{j=0}^{N-1} \begin{bmatrix} -\cos\phi_j & -\sin\phi_j \\ -\sin\phi_j & -\cos\phi_j \end{bmatrix} kt \cdot a \cdot \begin{bmatrix} 1 \\ Kr \end{bmatrix} \cdot g(\phi_j) \cdot [\sin\phi_j \ \cos\phi_j] \begin{bmatrix} \Delta x \\ \Delta y \end{bmatrix} \\
&= a \cdot Kt \cdot \sum_{j=0}^{N-1} g(\phi_j) \cdot \begin{bmatrix} -\cos\phi_j & -\sin\phi_j \\ -\sin\phi_j & -\cos\phi_j \end{bmatrix} \begin{bmatrix} \sin\phi_j & \cos\phi_j \\ Kr\sin\phi_j & Kr\cos\phi_j \end{bmatrix} \cdot \begin{bmatrix} \Delta x \\ \Delta y \end{bmatrix} \\
&= a \cdot Kt \cdot \sum_{j=0}^{N-1} g(\phi_j) \cdot \\
&\quad \begin{bmatrix} -\sin\phi_j\cos\phi_j - Kr\sin^2\phi_j & -\cos^2\phi_j - Kr\sin\phi_j\cos\phi_j \\ \sin^2\phi_j - Kr\sin\phi_j\cos\phi_j & \sin\phi_j\cos\phi_j - Kr\cos^2\phi_j \end{bmatrix} \begin{bmatrix} \Delta x \\ \Delta y \end{bmatrix}
\end{aligned} \quad (12)$$

Here, when Equation (13) is used, Equation (12) described above is represented by Equation (14).

$$\begin{aligned}
a_{xx} &= \sum_{j=0}^{N-1} -g(\phi_j)[\sin 2\phi_j + Kr(1 - \cos 2\phi_j)] \\
a_{xy} &= \sum_{j=0}^{N-1} -g(\phi_j)[(1 + \cos 2\phi_j) + Kr\sin 2\phi_j] \\
a_{yx} &= \sum_{j=0}^{N-1} g(\phi_j)[(1 - \cos 2\phi_j) - Kr\sin 2\phi_j] \\
a_{yy} &= \sum_{j=0}^{N-1} g(\phi_j)[\sin 2\phi_j + Kr(1 + \cos 2\phi_j)]
\end{aligned} \quad (13)$$

$$\begin{bmatrix} F_x \\ F_y \end{bmatrix} = \frac{1}{2} a \cdot Kt \cdot \begin{bmatrix} a_{xx} & a_{xy} \\ a_{yx} & a_{yy} \end{bmatrix} \begin{bmatrix} \Delta x \\ \Delta y \end{bmatrix} \quad (14)$$

Furthermore, when Equation (15) is used, Equation (14) is represented by Equation (16).

$$[A] = \begin{bmatrix} a_{xx} & a_{xy} \\ a_{yx} & a_{yy} \end{bmatrix} \quad (15)$$

$$\begin{bmatrix} F_x \\ F_y \end{bmatrix} = \frac{1}{2} a \cdot Kt \cdot [A] \begin{bmatrix} \Delta x \\ \Delta y \end{bmatrix} \quad (16)$$

Equation (16) is represented by Equation (17) by use of a time average cutting force described in the above document.

$$\begin{bmatrix} Fx \\ Fy \end{bmatrix} = \frac{1}{2} a \cdot Kt \cdot [A_0] \begin{bmatrix} \Delta x \\ \Delta y \end{bmatrix} \quad (17)$$

However, $[A_0]$ of Equation (17) is represented by Equation (18):

$$[A_0] = \frac{1}{T} \int_0^T [A] dt = \frac{1}{2\pi/N} \int_{\phi_{st}}^{\phi_{ex}} [A] d\phi \quad (18)$$

in which T is a period of the cutting.

In the above equations, the displacement of the tool is associated with fluctuation components of the cutting forces which act on the tool.

Next, a loop transfer function of a vibration system including the tool and the work is represented by Equation (19). In the system, the vibration of the cutting tooth of a previous period is fed back to the present chip thickness according to a principle of a regeneration effect shown in FIG. 2.

$$F(i\omega) = \frac{1}{2} a \cdot Kt(1 - e^{i\omega T})[A_0][\Phi(i\omega)] \cdot F(i\omega) \quad (19)$$

in which $[\Phi(i\omega)]$ is a transfer function of the forces which act on the tool and the work and of relative displacements.

A characteristic equation of this function can be represented by Equation (20).

$$\det\left[[I] - \frac{1}{2}Kt \cdot a \cdot (1 - e^{-i\omega T})[A_0][\Phi(i\omega)]\right] = 0 \quad (20)$$

Here, assuming that $[\Phi_0]$ and $\Lambda$ are represented by Equations (21) and (22), respectively, Equation (20) is represented by Equation (23).

$$[\phi_o] = [A_o][\Phi(i\omega)] \quad (21)$$

$$\Lambda = -\frac{1}{2}a \cdot Kt(1 - e^{-i\omega T}) \quad (22)$$

$$\det[[I] + \Lambda[\Phi_0(i\omega)]] = 0 \quad (23)$$

Here, $\Lambda$ can be obtained by analysis of an particular value of a matrix $[\Phi_0(i\omega)]$ in Equation (23). Moreover, a can be calculated from Equation (22).

Next, a particular frequency $\omega$ of a mechanical system is changed, and a stability limit depth of cut $a_{lim}$ and the cutting period T which satisfy these equations are converted into a tool rotation number S to thereby obtain a stability limit curve. This is performed on vibration frequencies which are integer times the particular frequency $\omega$, that is, all harmonics.

In a stage in which Equation (7) is calculated, when the matrix $[A_0]$ is calculated, the depth a of cut needs to be known. Therefore, the matrix $[A_0]$ is prepared first using the depth a of cut as an appropriate initial value. Subsequently, the calculation is performed with a as an unknown value to obtain the stability limit depth $a_{lim}$ of cut.

However, the stability limit depth $a_{lim}$ of cut obtained here is different from the value a presumed in obtaining the cutting start angle $\phi_{st}$ and the cutting end angle $\phi_{ex}$.

Therefore, in the present invention, ½ of a difference between $a_{lim}$ and a is fed back to a. That is, an operation represented by Equation (24) is repeatedly performed to repeat calculating the cutting start angle $\phi_{st}$ and the cutting end angle $\phi_{ex}$.

$$a \leftarrow a + \frac{1}{2}(a_{\lim} - a) \quad (24)$$

And, when the difference between $a_{lim}$ and a is smaller than a constant error range $\epsilon$, the above operation is ended.

The above operation is shown in a flow chart of FIG. 1. In the present embodiment, assuming that the allowable error range $\epsilon$ is 0.1 mm, the calculation is performed. In this case, the value is converged by repeating the calculation about four times.

Figure 8:
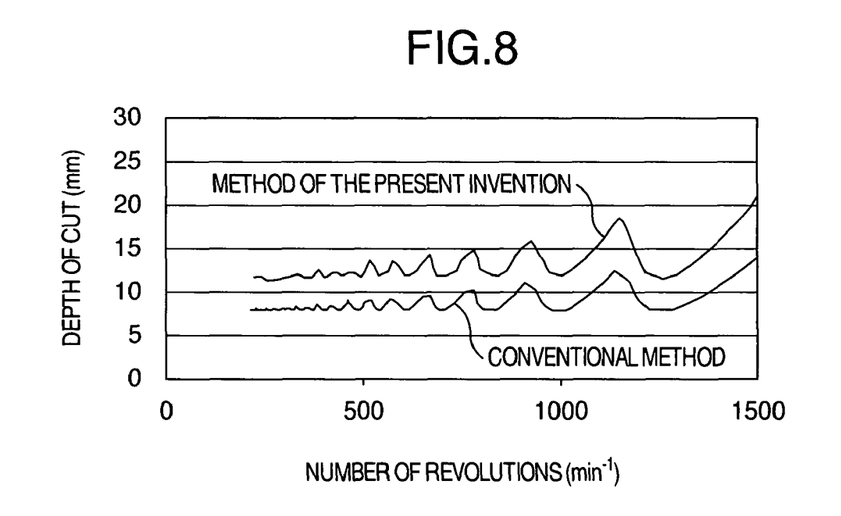
FIG. 8 is an explanatory view showing comparison between a stability limit depth of cut during oblique cutting according to the present invention and a stability limit depth of cut during conventional flat surface cutting.

Furthermore, it is seen from FIG. 8 that the oblique cutting has a larger stability limit depth of cut as compared with the flat surface cutting.

As described above, it is possible to analyze the stability limit of the self-excited cutting vibration during the cutting of the oblique surface by the rotary tool. The stable depth of cut in which any self-excited vibration is not generated can be estimated in advance to thereby reduce the number of steps necessary for preparation and correction of NC data.

Moreover, in general, it is known that the self-excited cutting vibration is not easily generated during the oblique cutting as compared with the flat surface cutting. However, according to the present invention, the stability limit depth of cut can be estimated with a good precision. When the NC data is prepared using a depth of cut larger than that of a conventional example, processing conditions can be set more efficiently without generating any self-excited vibration. As a result, components can be processed with a high efficiency.

Furthermore, in the above embodiment, the method for estimating the self-excited cutting vibration during the oblique cutting according to the present invention has been described in accordance with an example of a case where the only dynamic stiffness in the direction perpendicular to a tool rotation shaft of, for example, an elongated tool for use is considered.

Figure 5:
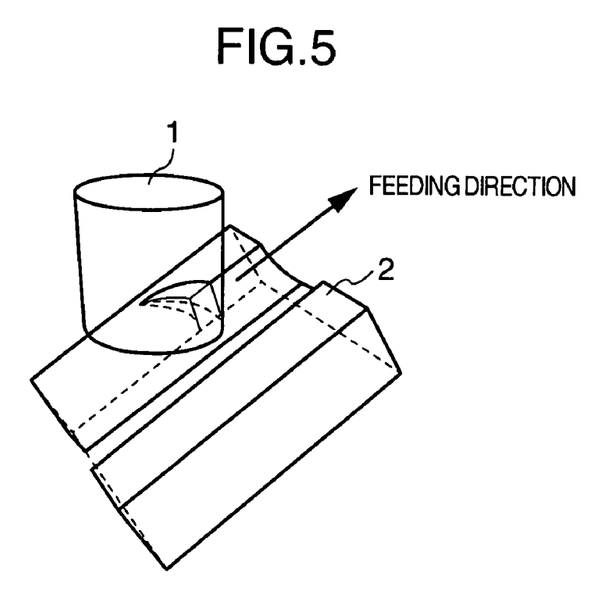
FIG. 5 is an explanatory view showing a case where a rotary tool according to the present invention is moved in a horizontal direction to perform cutting.

During the oblique cutting of a thin plate as shown in FIG. 5, the dynamic stiffness in a direction of the tool rotation shaft also needs to be considered. However, a cutting area geometry of the cutting tooth can be modeled using the technique of the present invention to calculate the stability limit depth of cut.

While we have shown and described several embodiments in accordance with our invention, it should be understood that disclosed embodiments are susceptible of changes and modifications without departing from the scope of the invention. Therefore, we do not intend to be bound by the details shown and described therein but intend to cover also such changes and modifications a fall within the ambit of the appended claims.

The invention claimed is:

1. A method for calculating a stability limit axial depth of cut of self-excited cutting vibration is not generated during cutting of an oblique surface, the method comprising:
    a first step of calculating a force acting on a cutting tool from an input initial value of an axial depth of cut by using, as input values, a cutting force coefficient determined by a combination of at least a tool geometry of said cutting tool and a work material, a tool diameter, a number of cutting teeth and a dynamic stiffness of said cutting tool, a depth of cut in a radial direction of said cutting tool, a dynamic stiffness of said work material, an angle formed by a rotation shaft and a feeding direction of said cutting tool, and a pick feed amount;
    a second step of obtaining a calculated force acting on the cutting tool and a transfer function of a vibration system including said cutting tool and said work material to calculate a stability limit axial depth of cut;
    a third step of adding to, a calculated stability limit axial depth of cut, an appropriate amount of correction based on a difference between said calculated stability limit axial depth of cut and an input axial depth of cut, and substituting for the initial value of said axial depth of cut; and
    a fourth step of comparing said calculated stability limit axial depth of cut with the stability limit axial depth of cut substituted as said initial value of said axial depth of cut, and repeating from said first step to said third step, until a difference therebetween reaches a predetermined value or less.

2. The method according to claim 1, further comprising:
    during the third step, repeating: comparing said calculated stability limit axial depth of cut with said initial value of the axial depth of cut; adding ½ of a difference between said calculated stability limit axial depth of cut and said initial value to said initial value of the axial depth of cut; and again calculating said calculated stability limit axial depth of cut by using the added value as an initial value of said axial depth of cut.

3. The method according to claim 1, wherein said appropriate amount of correction is ½ of a difference between said calculated stability limit axial depth of cut and said input axial depth of cut.

4. A method for calculating a stability limit axial depth of cut during cutting an oblique surface without generating any self-excited cutting vibration, the method comprising:
   determining forces which act on a cutting tool from each of input values, including a cutting force coefficient determined by a combination of at least a tool geometry of said cutting tool and a work material, a tool diameter, a number of cutting teeth and a dynamic stiffness of said cutting tool, a depth of cut in a radial direction of said cutting tool, a dynamic stiffness of said work material, a work oblique angle formed by a tool rotation shaft and a tool feeding direction of said cutting tool, and a tool movement amount in a direction substantially perpendicular to the tool rotation shaft and the tool feeding direction;
   calculating a stability limit axial depth of cut based on the forces which act on the cutting tool and a transfer function of a vibration system including said cutting tool and said work material;
   correcting the calculated stability limit axial depth of cut based on a difference between the calculated stability limit axial depth of cut and an input axial depth of cut, and substituting the corrected stability limit axial depth of cut for an initial value of said axial dept of cut; and
   making a comparison between the calculated stability limit axial depth of cut and the stability limit axial depth of cut substituted as said initial value of said axial depth of cut, and repeating the calculation and correction, until a difference therebetween reaches a predetermined value.

5. The method according to claim 4, further comprising:
   during the correction of the calculated stability limit axial depth of cut, repeating: comparing the calculated stability limit axial depth of cut with said initial value of the axial depth of cut; adding ½ of a difference between the calculated stability limit axial depth of cut and said initial value to said initial value of the axial depth of cut; and again calculating the calculated stability limit axial depth of cut by using the added value as an initial value of said axial depth of cut.

6. The method according to claim 4, wherein an appropriate amount of correction made during the correction of the calculated stability limit axial depth of cut is ½ of a difference between the calculated stability limit axial depth of cut and said input axial depth of cut.

* * * * *